United States Patent [19]
Mohn

[11] Patent Number: 5,264,135
[45] Date of Patent: Nov. 23, 1993

[54] METHOD FOR STABILIZING METALS IN WASTEWATER SLUDGE

[75] Inventor: Michael F. Mohn, Levittown, Pa.

[73] Assignee: Betz Laboratories, Inc., Trevose, Pa.

[21] Appl. No.: 854,503

[22] Filed: Mar. 19, 1992

[51] Int. Cl.$^5$ .......................... C02F 1/62; C02F 11/00
[52] U.S. Cl. ..................... 210/710; 210/751; 210/912; 588/256
[58] Field of Search ............. 210/710, 749, 751, 912, 210/729; 405/128, 129; 588/249, 250, 252, 266

[56] References Cited

U.S. PATENT DOCUMENTS

| | | | |
|---|---|---|---|
| 4,053,401 | 10/1977 | Fukushima et al. | 210/729 |
| 4,354,942 | 10/1982 | Kaczur et al. | 210/751 |
| 4,612,125 | 9/1986 | Elfine | 210/724 |
| 4,678,584 | 7/1987 | Elfine | 210/719 |
| 4,943,377 | 7/1990 | Legare | 210/709 |
| 4,957,634 | 9/1990 | Bowers, Jr. | 210/729 |

OTHER PUBLICATIONS

Chem. Abs. 112:204 187g.

*Primary Examiner*—Neil M. McCarthy
*Attorney, Agent, or Firm*—Alexander D. Ricci; Gregory M. Hill

[57] ABSTRACT

A method for treating the sludge from industrial wastewater streams which contain soluble metals by adding to the sludge an effective amount of a metal complexing agent sufficient to inhibit leaching of the metal from the sludge solids into the environment. The metal complexing agents comprise diethylcarbamate, dimethyldithiocarbamate, and sodium trithiocarbonate or salts thereof.

1 Claim, No Drawings

METHOD FOR STABILIZING METALS IN WASTEWATER SLUDGE

FIELD OF THE INVENTION

The present invention relates to the treatment of sludge produced from wastewater streams. Specifically, it deals with the stabilization of the precipitated metals found in the wastewater sludge.

BACKGROUND OF THE INVENTION

Metal-bearing wastewaters produced in industry have traditionally been treated by the addition of lime (calcium hydroxide) or caustic (sodium hydroxide) to precipitate metal hydroxide solids out of solution. The resulting solids are then separated from the clear water by settling or flotation. Typically, polymer treatments are added to the waste treatment system to aid in flocculating and agglomerating the solids for easier removal and less carryover in the effluent. The agglomerated solids are then collected as sludge, which is often disposed of by landfilling. Large amounts of these sludges are produced daily as a waste product from many different types of manufacturing processes involving metal fabrication, plating, finishing, etc.

However, as a result of the enactment of the Resource Conservation Recovery Act (RCRA), disposal of certain solid wastes recently became subject to the EPA Toxicity Characteristic Leaching Procedure (TCLP) test (Test Method 1311, Federal Register, Mar. 29, 1990 revised Jun. 29, 1990 herein incorporated by reference). Sludges produced from treatments in commercial metals-removal applications are classified as solid wastes and are thus subject to this test, which serves as one of the criteria for distinguishing between hazardous and non-hazardous wastes.

This test requires acidification of the sample, followed by instrumental analysis to measure the concentrations of any metallic ion(s) that may have been leached from the sample. Metal hydroxide-based sludges possess an inherent disadvantage with respect to this test method, since metal hydroxides exhibit resolubilization behavior under suboptimal pH conditions, including those of the TCLP test protocol.

Other treatments for metals removal also produce solid metal-containing precipitates. Precipitation of metal sulfides via addition of a soluble sulfide source (for example, sodium sulfide) is an effective technique for soluble metals removal. However, this process has a disadvantage in that the precipitated metal sulfide solids contained in the resulting sludge are easily oxidized to metal sulfates, and are then resolubilized, since many metal sulfate salts are water soluble.

The use of sodium borohydride to chemically reduce soluble metals to their elemental forms has also been used. This process produces very low volumes of sludge solids consisting of solid elemental metals. However, these metal solids will easily redissolve (i.e., corrode) if left in contact with an aqueous system.

Thus, each of the metal-based sludges generated from the techniques described above are likely to be relatively unstable under conditions similar to those of the TCLP test.

RELEVANT ART

Much of the art within the broad field of wastewater treatment focuses on treating the wastewater stream to remove the metals contained in the effluent. Known metal treating agents, such as alkali metal trithiocarbonates and alkyl thiocarbamates, are added to the wastewater stream in order to complex with both water soluble and suspended insoluble metals. This complex forms a precipitate and can be flocculated and agglomerated by further treatment.

U.S. Pat. No. 4,612,125, discloses such a method. Sodium trithiocarbonate is added to the metal containing wastewater. The metal-trithiocarbonate complex is then filtered out of the effluent, leaving a sludge cake relatively free of soluble trace metals.

Similar to the '125 patent is U.S. Pat. No. 4,678,584 which discloses the use of a trithiocarbonate to remove heavy metals from not only wastewater streams but from other metal bearing liquid, such as oil to be recycled as well. As in the previous patent, a metal-trithiocarbonate precipitate is formed which is then separated and removed from the liquid.

The same metal complexing agent is also utilized in U.S. Pat. No. 4,943,377. The sodium polythiocarbonate compound is added to the industrial wastewater or waste oil stream to complex with the dissolved heavy metals contained in the stream. The resulting precipitate is then separated from the liquid by gravity settling or removed by filtration.

The Chemical Abstracts contain a reference to a Japanese Kokai published in 1989, CA 112:204187g, which discloses treating the waste solids directly in order to prevent leaching of the metals contained therein. The treatment compound is a reaction product of ethylene diamine, sodium monochloroacetate and carbon disulfide.

DETAILED DESCRIPTION OF THE INVENTION

The present invention comprises the addition of a metal complexing agent to the sludge extracted from the wastewater stream of various industrial processes. The metal complexing agents encompassed by the invention are dimethyldithiocarbamate (DTC), diethyl carbamate (DEC) and trithiocarbonate (TTC), or salts thereof.

The effluent wastewater stream is traditionally treated in a clarifier with either caustic (NaOH) or lime ($Ca(OH)_2$). The amount of caustic or lime added to the wastewater stream will vary depending upon the initial, pretreatment pH of the water. The objective, though, is to raise the pH to a value corresponding to the minimum solubility of the resulting hydroxide solids generated from the chemical precipitation reaction of the metal ion(s) and free hydroxyl ion. The desired pH is typically around 9.

Once in the clarifier, the lime or caustic will complex with the soluble metals contained in the effluent wastewater to form metal hydroxides. These metal hydroxides will then precipitate out of solution and drop to the bottom of the clarifier. This precipitate is periodically drawn off from the bottom of the clarifier to form a sludge. The amount of solids present in the sludge will depend upon numerous variables, such as the amount of soluble metals present in the pretreated wastewater and the frequency of sludge removal. Many metal bearing sludges will contain up to about 30% by weight solids, with most of them having about 20% by weight or less.

The sludge drawn off from the clarifier is then typically transported to a press for dewatering. Prior to pressing, however, is the most desirable stage to add the metal complexing agents of the present invention. These compounds are added to the sludge in an amount sufficient to stabilize the metal hydroxides contained in the sludge solids. Stability is defined herein as a reduction in the propensity of the metal hydroxide in the dewatered sludge to redissolve and leach out into the environment as solubilized metals or ions, under the acidic conditions which can be found in the landfill or other places of disposition for the dewatered sludge. Stabilization of these metal hydroxides will permit the sludge to pass the stringent requirements of the TCLP test and satisfy the mandate of the RCRA regarding the disposal of metals containing solid wastes. The maximum acceptable levels for certain metals, as defined in the Federal Register (Toxicity Characteristic Final Rule, Mar. 29, 1990) are as follows:

| TCLP Maximum Limits for Inorganics | |
|---|---|
| | ppm |
| Arsenic | 5 |
| Barium | 100 |
| Cadmium | 1 |
| Chromium | 5 |
| Lead | 5 |
| Mercury | 0.2 |
| Selenium | 1 |
| Silver | 5 |

In the future, TCLP maximum limits for metals may become even more stringent. Additionally, maximum limits may be defined for more metals not presently listed.

The amount of the metal complexing agent according to the present invention which is added to the sludge is in the range of 5 to 50,000 ppm. The most appropriate amount of treatment agent necessary will vary from process to process depending on the amount and type of solids present in the sludge and the preparation of metal hydroxides present in the solid waste. The proper administration level should be determined by running periodic TCLP tests.

EXAMPLES

The following examples show the utility of the present invention. There is no intention to limit its scope to these results. A sample of waste pickle liquor was obtained from a specialty steel mill located in Reading, Pa. The pickle liquor contained hydrochloric and sulfuric acids, as well as large amounts of dissolved metals (see Table 1, below) and relatively small amounts of alkaline cleaner waste.

This steel mill currently treats this waste pickle liquor by adjustments with lime to a pH of 9, followed by addition of an acrylamide/acrylic acid anionic polymer as a settling aid. After solids settling, the mixed metal hydroxide sludge is dewatered using a belt press.

For the purpose of facilitating handling, the waste pickle liquor was diluted ten-fold and adjusted to a pH of 9. NaOH and $Ca(OH)_2$ were used as benchmark standards. Other test samples were treated first with lime (to pH 9) and then with two different concentrations of each of the sodium salts (Na) of DTC and TTC. The sludges were then analyzed according to the TCLP protocol. Results are shown in Table II.

TABLE I

| Analysis of Steel Mill Waste Acid Pickle Liquor (prior to treatment) | |
|---|---|
| Component | Concentration(ppm) |
| Al | 6.8 |
| Sb | 0.34 |
| As | 0.15 |
| Ba | 1.87 |
| Cd | 0.09 |
| Cr | 7.49 |
| Co | 4.7 |
| Cu | 27.0 |
| Fe | 2166 |
| Pb | 1.5 |
| Mn | 19.1 |
| Hg | <0.002 |
| Ni | 210 |
| Se | <0.025 |
| Zn | 6.5 |

Note: This sample was diluted ten-fold and filtered through a 0.45 um filter.

TABLE II

| | Effect of Chemical Treatments on TCLP Sludge Extract Analyses Wastewater Substrate: Steel Mill Waste Acid Pickle Liquor | | | | | |
|---|---|---|---|---|---|---|
| | | | Sludge Treatment | | | |
| Element | Sodium Hydroxide | Lime | Lime & NaDTC 25 ppm | Lime & NaDTC 250 ppm | Lime & NaTTC 25 ppm | Lime & NaTTC 250 ppm |
| Al, ppm | 4.70 | 4.75 | 2.82 | 4.25 | 3.99 | 1.78 |
| Sb, ppm | 1.40 | <0.02 | <0.02 | <0.02 | <0.02 | <0.02 |
| As, ppm | 0.240 | 0.04000 | 0.02500 | 0.04700 | 0.01700 | 0.02500 |
| Cd, ppm | <0.00200 | <0.00200 | <0.00300 | <0.00200 | <0.00200 | <0.00200 |
| Cr, ppm | 131. | 30.4 | 14.3 | 21.3 | 22.1 | 12.6 |
| Co, ppm | 2.10 | 1.70 | 2.18 | 2.11 | 2.00 | 1.92 |
| Cu, ppm | 11.5 | 9.04 | 6.75 | 6.71 | 5.68 | 0.344 |
| Fe, ppm | 813. | 184. | 110. | 134. | 138. | 447. |
| Mn, ppm | 8.60 | 10.1 | 12.6 | 12.0 | 11.1 | 10.4 |
| Hg, ppm | 0.00020 | <0.0 | <0.0 | <0.0 | <0.0 | <0.0 |
| Hi, ppm | 99.0 | 71.5 | 90.1 | 84.0 | 84.0 | 84.2 |
| Se, ppm | <0.02000 | <0.02 | <0.02 | <0.02 | <0.02 | <0.02 |
| Zn, ppm | 1.90 | 0.766 | 0.915 | 0.815 | 0.793 | 0.715 |

Table II shows that the TCLP extracts obtained from the sludge treated with NaDTC and NaTTC after lime adjustment contained lower concentrations of several dissolved metals compared to the sludge sample treated with lime only. Final metal concentrations were determined by ICP [Inductively Coupled Plasma].

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What I claim is:

1. A method for treating wastewater sludge separated from metal-bearing wastewaters produced from commercial metals-removal applications which sludge contains metal hydroxide precipitates comprising adding to the sludge from 5 to 5,000 ppm of a metal complexing agent selected from the group consisting of dimethyldithiocarbamate, diethylcarbamate, and trithiocarbonate, or salts thereof, to complex with and stabilize the metal hydroxide precipitates in said sludge thereby reducing the propensity of said metal hydroxide precipitates to redissolve and leach into a sludge disposal environment under acidic leaching conditions found in said sludge disposal environment.

* * * * *